United States Patent [19]

Keeny, III

[11] 4,191,283
[45] Mar. 4, 1980

[54] HELICAL SPRING COUPLING WITH PROGRAMMABLE CONTROL COLLAR

[75] Inventor: Harry F. Keeny, III, Turnersville, N.J.

[73] Assignee: Warner Electric Brake & Clutch Company, South Beloit, Ill.

[21] Appl. No.: 936,491

[22] Filed: Aug. 24, 1978

[51] Int. Cl.² ............................................. F16D 11/06
[52] U.S. Cl. ....................................... 192/26; 192/22; 192/33 C; 403/359
[58] Field of Search ................. 192/26, 12 BA, 22, 27, 192/81 R, 33 C

[56] References Cited
U.S. PATENT DOCUMENTS

| | | | |
|---|---|---|---|
| 3,340,975 | 9/1967 | Erickson | 192/81 R |
| 3,545,580 | 12/1970 | Baer | 192/26 |
| 3,559,781 | 2/1971 | Brunelle | 192/26 |
| 3,797,618 | 3/1974 | Peterson | 192/12 BA |

*Primary Examiner*—Benjamin Wyche
*Attorney, Agent, or Firm*—Leydig, Voit, Osann, Mayer & Holt, Ltd.

[57] ABSTRACT

The control collar of a helical spring clutch is defined in part by a series of rings having radially projecting stop lugs which coact with an interposer. The rings may be adjusted angularly relative to one another to cause the lugs to effect successive disengagements of the clutch as the output member of the clutch is rotated through a selectively adjustable number of steps of selectively adjustable angular length.

7 Claims, 7 Drawing Figures

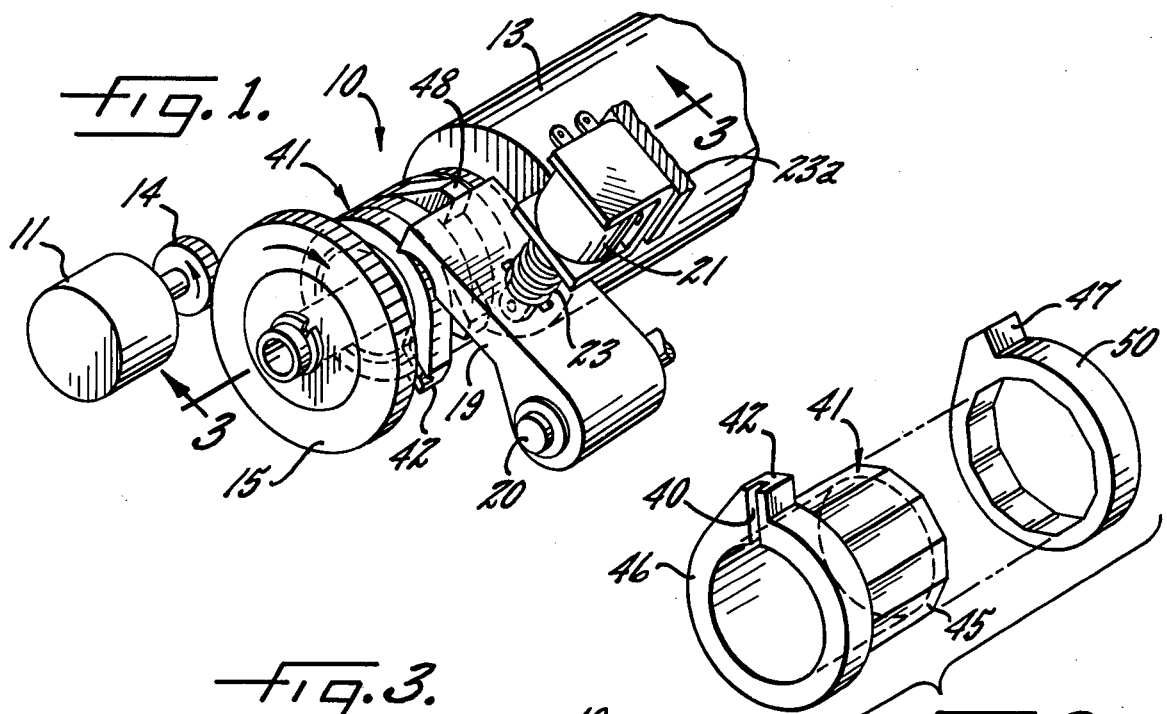

HELICAL SPRING COUPLING WITH PROGRAMMABLE CONTROL COLLAR

BACKGROUND OF THE INVENTION

This invention relates to a selectively engageable and disengageable coupling having a rotatable member, a coiled helical spring and an intermittently rotatable control collar operable to expand and contract the spring relative to the rotatable member to change the state of engagement of the coupling.

More specificaly, the invention pertains to a coupling in the form of a clutch in which the spring normally is contructed around coaxial input and output members to couple the members for rotation in unison and in which the control collar is telescoped over the members and is anchored to one end of the spring. The collar normally rotates in unison with the members but is operable when stopped by an interposer to cause unwinding of the spring and thereby effect disengagement of the clutch. When the clutch is disengaged, the input member continues to rotate while the output member stops in an angular position determined by the angular position of the interposer.

A clutch of this general type is disclosed in Baer et al U.S. Pat. No. 3,726,372. In the Baer et al clutch, the interposer engages a single stop on the control collar and thus the output member is stopped in the same angular position each time the interposer is acutated to its active position and engages the stop. Because the control collar has only a single stop, the output member must turn through one or more full revolutions before the clutch can be disengaged.

Helander U.S. Pat. No. 3,835,972 discloses a helical spring clutch in which the control collar may be formed with more than one stop for engaging the interpose. With this arrangement, the clutch may be disengaged to effect indexing of the output member to a plurality of angularly spaced positions corresponding to the number and angular spacing of the stops.

In certain instances, it is desirable to stop the output member in a plurality of angular positions which may be selectively changed. To this end, the Helander control collar may be selectively rotated on the output member to adjust the angular position of the stops relative to the output member and the interposer. This enables the output member to be stopped in different angular positions relative to the interposer but does not permit changing of the angular spacing between the positions.

An arrangement in which the angular spacing between the stopped positions of the output member can be changed is disclosed in Schulman U.S. Pat. No. 3,979,975. In this arrangement, use is made of a plurality of angularly spaced interposers whose angular spacing can be selectively adjusted. The interposers are adapted to sequentially engage a stop on the control collar and thus the angular spacing between the stopped positions of the output member can be changed by adjusting the angular spacing of the interposers.

SUMMARY OF THE INVENTION

The general aim of the present invention is to provide a new and improved selectively engageable helical spring coupling having a rotatable member which is adapted to be stopped by a single interposer in a plurality of positions whose number and angular spacing may be selectively and easily changed.

A related object of the invention is to achieve the foregoing by providing a coupling having a unique control collar which includes a plurality of stops adapted to be adjusted angularly relative to one another.

In a more detailed sense, the invention resides in the provision of a control collar whose stops are formed on a plurality of rings adapted to be adjusted on a central sleeve, the rings and the sleeve being shaped to enable quick and easy adjustment of the angular positions of the stops.

These and other objects and advantages of the invention will become more apparent from the following detailed description when taken in conjunction with the accompanying drawings.

BRIEF DESCRIPTION OF THE DRAWINGS

FIG. 1 is a perspective view schematically showing a typical drive system equipped with a new and improved selectively disengageable coupling incorporating the unique features of the present invention.

FIG. 2 is an exploded perspective view of certain parts of the control collar of the coupling.

FIG. 3 is an enlarged fragmentary cross-section taken substantially along the line 3—3 of FIG. 1.

FIGS. 4, 5 and 6 are cross-sections taken substantially along the lines 4—4, 5—5 and 6—6, respectively, of FIG. 3.

FIG. 7 is a view similar to FIG. 6 but shows certain parts of the coupling in moved positions.

DETAILED DESCRIPTION OF THE PREFERRED EMBODIMENT

As shown in the drawings for purposes of illustration, the invention is embodied in a clutch 10 for coupling a driving element 11 and a driven element 13 for rotation in unison and selectively operable to uncouple the elements to allow rotation of either relative to the other. While the clutch will find numerous applications in widely varying environments, it is shown schematically in the drawings as being incorporated in a system in which the driving element 11 is a small motor and the driven element 13 is a paper feed roller. The motor 11 is connected by way of gears 14 and 15 to the input of the clutch 10 whose output, in turn, is connected to one end of the end of the roller 13.

Associated with the clutch 10 is a stop or so-called interposer 19 which effects disengagement of the clutch to enable relative rotation between the motor 11 and the roller 13. The interposer comprises an arm which is pivoted about a horizontal axis at 20 to swing upwardly and downwardly between an inactive position enabling engagement of the clutch and an active position effecting disengagement of the clutch. Energization of a solenoid 21 serves to swing the interposer upwardly to its inactive position while a compression spring 23 urges the interposer downwardly toward its active positionwhen the solenoid is de-energized. The solenoid 21 and the pivot 20 for the interposer 19 are supported on a suitable frame or bracket 23a.

The clutch 10 is shown in detail in FIG. 3 and includes an output member 24 which is telescoped over and connected rigidly to one end portion of a central sleeve 25. A trunnion 26 on the end of the roller 13 is telescoped into the sleeve and is anchored for rotation with the latter by a set screw 27 thread into the output member and the sleeve. Telescoped rotatably over the opposite end portion of the sleeve is an input member 29 to which the driving gear 15 is press-fitted, a snap ring 30 on the end of the sleeve preventing movement of the input member along the sleeve. Thus, the motor 11 rotates the input member 29 on the sleeve 25 via the gear 15 and, when the input member is coupled to the output member 24, the latter rotates the sleeve to turn the roller 13. When the input and output members are uncoupled, the input member rotates freely on the sleeve while the output member remains stationary.

To releasably couple the output and input members 24 and 29, a coiled helical spring 31 is telescoped over reduced diameter hubs 33 and 34 (FIG. 3) formed at the inner end portions of the output and input members, respectively, and disposed end-to-end with one another. Between its ends, the spring includes a number of turns or coils wound on a left hand helix and wound with a relaxed inner diameter which is less than the diameter of the hubs. Accordingly, when the spring is telescoped over the hubs, the coils expand to receive the hubs and then resiliently contract around and hug the hubs.

Formed on that end of the spring 31 located adjacent the outer end of the output hub 33 is an axially extending tang 35 (FIG. 3) which is fitted in an axially extending slot 36 formed in a ring 37. The latter constitutes part of the output member 24 and is fastened to the output hub 33 by a set screw 38. A radially extending tang 39 is formed on the opposite end of the spring and fits snugly in a radially extending slot 40 formed in the end of an annular control collar 41 which is telescoped loosely over the spring. The slot extends radially along and is centered relative to a comparatively narrow stop or lug 42 formed integrally with and projecting radially from the control collar and adapted to engage and coact with the interposer 19 to cause disengagement of the clutch 10.

When the solenoid 21 is energized, the interposer 19 is retracted upwardly away from the control collar 41 and the lug 42 and is disposed in an inactive position as shown in phantom lines in FIG. 6. With the interposer in its inactive position, the helical spring 31 is contracted around the hubs 33 and 34 and couples the hubs for rotation in unison. Thus, when the motor 11 is energized to turn the input hub 34, the spring turns the output hub 33 and causes turning of the roller 13. As an incident to turning, the input hub 34 exerts clockwise (FIGS. 6 and 7) torque on the coils of the spring and tends to wind and contract the coils so that the spring grips the hubs even more tightly to insure against slippage.

As long as the interposer 19 is in its inactive position, the control collar 41 is free to turn and thus the tang 39 of the spring 31 rotates the collar in unison with the hubs 33 and 34. Disengagement of the clutch 10 is effected by stopping the control collar as, for example, by de-energizing the solenoid 21 to cause the spring 23 to shift the interposer downwardly to its active position (as shown in solid lines in FIG. 6) in which the interposer is located in the path of the leading face of the stop lug 42. When the stop lug engages the interposer, further rotation of the collar 41 and the tang 39 is stopped. The input hub 34, however, continues to rotate and, as an incident to such rotation, continues to exert clockwise torque on the spring 31. Because the stopped tang prevents turning of the input end of the spring, such torque tends to unwind and radially expand the coils of the spring to release the coils from tight gripping engagement with the hubs and thereby enable the input hub 34 to free-wheel relative to the output hub 33.

The clutch 10 may be re-engaged by shifting the interposer 19 to its inactive position to release the collar 41 for rotation. If the interposer is back in its active position just before the lug 42 again reaches the interposer, the clutch will be disengaged to stop the output member 24 and the roller 13 after the latter have turned through one full revolution.

In accordance with the present invention, the control collar 41 of the clutch 10 is uniquely constructed to enable the interposer 19 to effect repeated disengagement of the clutch as the output member 24 is turned through steps of selected angular length, the collar enabling the number of steps to be selectively established and permitting the angular length of each step to be selectively adjusted. By virtue of the novel collar, the clutch may be selectively programmed to enable the single interposer 19 to effect stopping of the feed roller 13 after the latter has been rotated continuously through one revolution or to effect step-by-step indexing of the roller through one revolution in a selectively adjustable number of steps of selectively adjustable angular length.

More specifically, the control collar 41 is formed by a central sleeve 45 (FIG. 2) whose interior surface is cylindrical in shape to enable the sleeve to be telescoped loosely over the spring 31. A radially projecting flange 46 is formed integrally with the outer end of the sleeve 45, the flange being formed with the slot 40 for receiving the tang 39 of the spring 31. Also, the stop lug 42 is formed integrally with and projects radially from the flange.

In carrying out the invention, a series (herein, three) of additional stops 47, 48 and 49 (FIG. 6) are spaced axially from the stop lug 42 and are adapted to be adjusted angularly relative to the stop lug 42 and relative to one another. In the present instance, the stops 47, 48 and 49 are in the form of lugs which are integral with and project radially from three rings 50, 51 and 52 (FIG. 3), respectively. The rings are adapted to be telescoped onto the sleeve 45 with the ring 50 abutting the flange 46 and with the ring 51 sandwiched between the rings 50 and 52. A snap ring 53 fits in a groove in the output member 24 and engages the rings 52 to hold the rings on the sleeve 45 and to captivate the sleeve against inward axial shifting.

Advantageously, the interior surface of each of the rings 50, 51 and 52 is shaped as a regular polygon (see FIG. 2) and, in this particular instance, the polygon includes twelve sides. Also, the outer surface of the sleeve 45 is shaped as a complementary twelve-sided polygon as shown in FIG. 2. As a result, any given ring may be positioned on the sleeve with its stop lug 47, 48 or 49 spaced from the stop lug 42 by any angle which is a multiple of thirty degrees.

One possible arrangement of the rings 50, 51 and 52 and the lugs 47, 48 and 49 is shown in FIG. 6. In that instance, the ring 50 is positioned with its lug 47 spaced thirty degrees from the lug 42, the ring 51 is positioned with its lug 48 spaced sixty degrees from the lug 47 and the ring 52 is positioned with its lug 49 spaced ninety degrees from the lug 48.

The interposer 19 is of sufficient axial width as to span the axial distance between the lug 42 and the lug 49 and thus the interposer is capable of engaging all four lugs 42 and 47, 48 and 49. Also, the solenoid 21 is adapted to be momentarily pulsed to raise the interposer upwardly to clear any given lug and then to immediately return the interposer downwardly into position to engage the next lug.

When the interposer 19 is positioned as shown in full lines in FIG. 6, the interposer is engaging the lug 42 and thus the clutch 10 is disengaged. Engagement of the clutch is effected when the interposer is momentarily swung upwardly to its inactive position shown in phantom lines to permit the lug 42 to rotate past the interposer, the latter then being returned downwardly.

After the clutch 10 has effected rotation of the feed roller 13 through thirty degrees, the lug 47 engages the interposer 19 to disengage the clutch and stop the feed roller (see FIG. 7). When the interposer is next pulsed, the clutch is engaged until the feed roller rotates through an additional sixty degrees and the lug 48 engages the interposer. The next disengagement occurs after the feed roller has been rotated through an additional ninety degrees and the lug 49 engages the interposer. As the feed roller rotates through its final one-half revolution, the lug 42 engages the interposer to once again disengage the clutch.

Because the rings 50, 51 and 52 can be adjusted to various angular positions on the sleeve 45, it is possible to effect disengagement of the clutch 10 after the feed roller 13 has been rotated through a selectively adjustable number of steps of selectively adjustable angular length. For example, by adjusting the rings so that the lugs 47, 48 and 49 are all in line with the lug 42, the control collar 41 effectively includes only one stop and thus the feed roller may be rotated continuously through a full revolution before the clutch is disengaged. By alining the lug 47 with the lug 42 and by alining the lug 48 with the lug 49 at a position spaced 180 degrees from the lugs 47 and 42, the collar effectivley includes two stops and is effective to disengage the clutch after each half-revolution of the feed roller. Three equally spaced stops can be effected by alining the lug 47 with the lug 42, by spacing the lug 48 120 degrees from the lug 47 and by spacing the lug 49 120 degrees from the lug 48. And, four equally spaced stops can be accomplished by spacing each lug ninety degrees from its adjacent lug. Or, the lugs can be arranged in unequally spaced relationship as shown in FIG. 6 and as has been explained above.

From the foregoing, it will be apparent that the present invention brings to the art a new and improved helical spring coupling 10 having a control collar 41 which may be easily programmed to effect disengagement of the coupling after the rotatable member 24 has been turned through a selectively adjustable number of steps of selectively adjustable angular length. Those familiar with the art will appreciate that rings constructed differently from the rings 50, 51 and 52 could be used to fulfill the purposes of the invention. For example, the rings could be internally splined and could mate with external splines on the sleeve 45 to enable adjustment of the rings in very small increments.

I claim:

1. A selectively engageable and disengageable coupling having at least one rotatable member, a helical spring telescoped with said member, an intermittently rotatable control collar operable to expand and contract said spring relative to said member to change the state of engagement of said coupling, and an interposer selectively movable between inactive and active positions permitting and preventing rotation of said collar, said collar comprising a sleeve coaxial with said rotatable member and connected to said spring, a plurality of stops spaced axially along said sleeve and operable to engage said interposer to prevent rotation of said collar when said interposer is in said active position, and means mounting said stops for selective angular adjustment relative to one another one said sleeve and enabling the angular spacing between said stops to be selectively changed.

2. A clutch having first and second coaxial members disposed end-to-end, a coiled helical spring telescoped over both of said members and normally contracted around the members to couple the latter together for rotation in unison in one direction, a control collar telescoped loosely over said spring and anchored to one end of the spring, said collar normally being rotatable in unison with said members and being operable when stopped to cause unwinding and expansion of said spring in response to continued rotation of one of said members thereby to enable relative rotation between the members, and means selectively movable between inactive and active positions permitting and preventing rotation of said collar, said clutch being characterized in that said collar includes a plurality of axially spaced stops for engaging said means and preventing rotation of said collar when said means is in said active position, at least one of said stops being adjustable angularly relative to at least one other one of said stops.

3. A clutch as defined in claim 2 in which said collar comprises a sleeve, a ring telescoped with said sleeve and adjustable to different angular positions on said sleeve, at least one of said stops being carried by said ring.

4. A clutch as defined in claim 2 in which said collar comprises a sleeve having an outer periphery shaped as a regular polygon, a plurality of rings telescoped over said sleeve, each of said rings having an inner periphery shaped as a regular polygon and complementary to the shape of the outer periphery of said sleeve, said stops being carried by said rings.

5. A clutch having first and second coaxial members disposed end-to-end, a coiled helical spring telescoped over both of said members and normally contracted around the members to couple the latter together for rotation in unison in one direction, a control collar telescoped loosely over said spring and anchored to one end of the spring, said collar normally being rotatable in unison with said members and being operable when stoped to cause unwinding and expansion of said spring in response to continued rotation of one of said members thereby to enable relative rotation between the members, and means selectively movable between inactive and active positions permitting and preventing rotation of said collar, said clutch being characterized in that said collar includes a sleeve having an outer periphery of non-circular shape, a row of rings telescoped over said sleeve, each of said rings having an inner periphery of non-circular shape which is complementary to the shape of the outer periphery of said sleeve, and stops carried on said rings and engageable with said means to prevent rotation of said collar when said means is in said active position, said stops being angularly adjustable relative to one another by angularly re-positioning said rings on said sleeve.

6. A clutch as defined in claim 5 in which the outer periphery of said sleeve is shaped as a regular polygon, the inner periphery of each of said rings also being shaped as a regular polygon.

7. A clutch as defined in claim 6 further including a radially projecting flange formed integrally with one end of said sleeve, and an additional stop carried by said flange.

* * * * *